L. W. HAMMOND.
TWO-COLLAR HARNESS.
APPLICATION FILED JAN. 6, 1913.
1,153,908.
Patented Sept. 21, 1915.
2 SHEETS—SHEET 1.
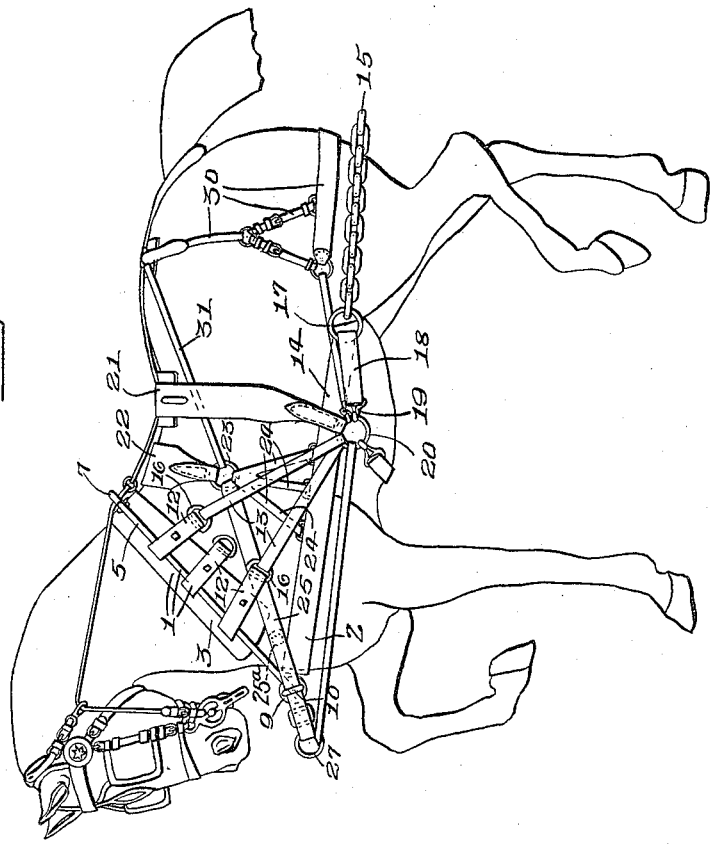

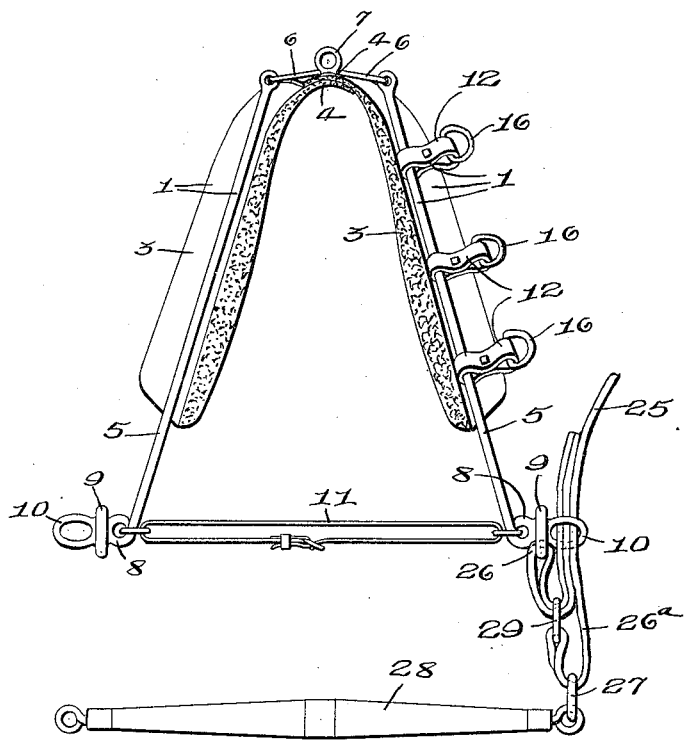
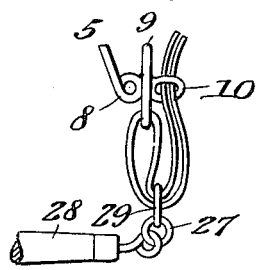

UNITED STATES PATENT OFFICE.

LUTHAN WHITTEN HAMMOND, OF VENICE, NEW YORK.

TWO-COLLAR HARNESS.

1,153,908.  Specification of Letters Patent.  Patented Sept. 21, 1915.

Application filed January 6, 1913. Serial No. 740,558.

*To all whom it may concern:*

Be it known that I, LUTHAN WHITTEN HAMMOND, a citizen of the United States, and a resident of Venice, in the county of Cayuga and State of New York, have invented a new and useful Two-Collar Harness, of which the following is a specification.

This invention relates to harnesses and has for its object a combination of hame and breast collars whereby the pull of the tugs is distributed equally over the breasts and shoulders of the draft animals; and it consists in the novel combinations and constructions hereinafter set forth and claimed.

Other objects will appear throughout the specification.

In describing this invention, reference is had to the accompanying drawings, in which like characters designate corresponding parts in all the views.

Figure 1 is an elevation of a harness embodying my invention, the same being shown on a horse. Fig. 2 is a front elevation of the combined hame and breast collar and contiguous parts. Fig. 3 is a fragmentary view illustrating a slightly modified form of the connection between the single horse neck yoke and the hold back straps.

This invention comprises, generally, a harness embodying a hame collar and a breast collar, and tugs connected to both of said collars and to the traces.

1 designates the hame collar, and 2 the breast collar. The hame collar is open at the throat and consists of a body 3 which includes opposite side portions connected together at their upper ends. The side portions are provided with suitable flaps 4 at their upper ends which overlap on the neck of the animal, these flaps being perforated for receiving suitable fastening means.

5 are the hames which are connected together at their upper ends by a strap 6 carrying a ring nut 7 through which the check reins may be passed. The lower ends of the hames are provided with eyes 8 to which are connected rings 9 and 10 for a purpose to be hereinafter described. The lower ends of the hames 5 are connected and held from separating by a hame strap 11. Each hame with its rings 8, 9, 10, is bent from a round straight rod.

The collar body 3, when in position, terminates above the breast collar 2, and the hames 5 extend at their lower ends beyond the ends of the pad 3, outside and in front of the breast collar. The hame collar is provided with a plurality of tug couplings as loops 12 on each side thereof, it being here shown as provided with three loops on each side and only two of these loops are connected to tugs, the other remaining idle or may be used as a rein guide or terret. These loops are merely means by which the tugs are connected to the hame collar. The loops 12 are suitably connected to the collar to prevent them from shifting along the hames.

13 designates the tugs connected to the hame collar, and 14 the tugs connected to the breast collar, the tugs 14 being the rear ends of the breast collar. 15 are the traces to which the tugs are connected. The tugs 13 are connected at their front ends to rings 16 in the rear ends of the couplings or loops 12 of the hame collar, and the tugs 13, 14 are connected to the traces by suitable means by which the pull on the tugs 13, 14 is equalized or evenly distributed between the breast and neck collars. As here shown, the rear ends of the breast collar tugs 14 are passed through the rings 17 at the front ends of the traces 15 and are brought forward at 18 and connected by a snap catch or other fastening means 19 to a ring 20 through which the tugs 13 are looped. I usually employ two tugs 13 on each side of the hame collar, one of which is a continuation of the other so that the tugs slide in the ring 20, but if only one tug connected to each side of the hame is used, it would be connected to the middle loop 12 and connected by a snap catch or otherwise to the ring 20. The ring 20 is supported by what for convenience is called the back strap or pad 21 of the harness. The breast collar is supported by a strap 22 extending across the withers and called for convenience a withers pad, said pad 22 having a ring 23 at each end to which are connected straps 24 which support the breast collar. The feature of the withers pad is that it provides means for supporting the hold backs and load in the rear of the neck collar.

25 are double hold-back straps, each connected at its upper end to one of the rings 23 and being divided or spliced at 25ª at its lower end and one branch being connected to the lower end of one hame as by having its front end passed through the ring 10 at the lower end of the hame and looped through the ring 9, as shown at 26, and the front end 26ᵃ of the other length being passed through a ring 27 at either end of the single horse or jockey neck yoke 28 and having a ring 29 at its front end through which is passed the loop 26 of the length secured to the hame. The ring 23, which is here shown as embodied in the breast collar support 22, is connected to the breeching 30 in any suitable manner, as by a strap 31. Said breeching is connected to the tugs in the usual manner at the rings 20. In farm implements, and in some wagons, the pole is supported by the draft animals, and by my hold back straps the weight of the pole is supported from the withers and not wholly from the neck. Each hold back strap is provided with a buckle by which the lengths can be lengthened or shortened.

In the form of hold back straps shown in Fig. 2 the greater part of the weight of the neck yoke and parts connected thereto, as the wagon pole, is supported from the withers pad. However, as seen in Fig. 3, this weight may be carried equally by the hames and hold back straps and this result is effected by omitting either the loop 26 or 26ᵃ and supporting the neck yoke 28 from the loop not omitted as by connecting the ring 27 at each end of the neck yoke 28 to the ring 29 and by omitting the hold back straps 26ᵃ, the neck yoke 28 now being connected directly to the loop 26, which loop is connected to the hame and to the withers pad. Hence, the weight on the neck yoke 20 is distributed equally between the hames and the withers pad. However, the loop 26 may be omitted and the ring 29 at the end of loop 26ᵃ connected directly to the hame after being passed through the ring 27 at the end of the neck yoke.

This harness is particularly advantageous in that the pull of the tugs is distributed equally over the shoulders and breast of the draft animal, and the tugs are so connected to the traces that the tension on the tugs is equalized, and further in that the hold backs are so connected that the weight of the pole is taken off the necks of the animals. The rings referred to are sliding connections and the term ring instead of a broader term is used for the sake of brevity.

What I claim is:

1. In a harness, a hame collar, and a breast collar, the hame collar including a body open at the throat and hames, the sides of the breast collar extending below the ends of the body, and the lower ends of the hames extending outside and in front of the breast collar and below the lower ends of the collar body, traces, and tugs connected to the hame collar, the breast collar and to the traces, substantially as and for the purpose described.

2. In a harness, a hame collar, a breast collar, tugs connected to the hame collar, the rear ends of the breast collar constituting tugs, traces connected to the tugs and equalizing means between each trace and the tugs on one side of the harness, said means including a ring to which the tugs are connected, the tugs of the breast collar being slidably connected to the traces in the rear of the ring and looped forwardly and secured to the ring, substantially as and for the purpose specified.

3. In a harness, a collar including hames, traces, tugs connected to the collar and to the traces, a neck yoke and hold back straps connected to the lower ends of the hames to be supported thereby and to the neck yoke and also to the harness in the rear of the collar to be supported by the harness in the rear of the collar, substantially as and for the purpose set forth.

4. In a harness, a hame collar, and a breast collar, the hame collar including a body open at the throat and hames, the sides of the breast collar extending below the ends of the body, and the lower ends of the hames extending outside and in front of the breast collar and below the lower ends of the collar body, traces, tugs connected to the hame collar, the breast collar and to the traces, and neck yoke and hold back straps secured to, and supported by, the lower ends of the hames, substantially as and for the purpose described.

5. In a harness, a hame collar including a body and hames and a breast collar, the hame collar being open at its lower end for permitting the use of the breast collar, and the breast collar being designed to pass below the lower ends of the body of the hame collar, and the hames extending below the ends of the hame collar body and in front of, and to the outside of, the breast collar, tugs connected to the hame collar and the breast collar, traces connected to the tugs, a neck yoke and hold-back straps each including two branches one connected to the neck yoke and the other to one hame and both being connected to the harness in the rear of the hame collar, substantially as and for the purpose described.

6. In a harness, a hame collar including a body and hames, tugs connected to the hame collar, a withers pad, a neck yoke having rings at its ends and hold-back straps each having branches connected to the lower ends of the hames and branches passing through the rings of the neck yoke and having rings through which the former branches of the hold-back straps are passed, said rings being located near the points at which the former branches are connected to the lower ends of the hames, the rear ends of the branches being connected to the withers pad, substantially as and for the purpose specified.

7. In a harness, a hame collar, a breast collar, the rear ends of which constitute tugs, traces having rings at their front ends, the rear ends of the breast collar tugs being passed through the rings and brought forwardly, a back pad and rings at opposite ends of the back pad, tugs connecting the hame collar and the last-mentioned rings, the ends of the loops of the breast collar tugs being also connected to the latter rings, substantially as and for the purpose set forth.

8. In a harness, a hame collar including a body and hames, a breast collar, the hame collar being open at the throat and the breast collar being designed to pass below the lower end of the body of the hame collar, and the hames extending below the lower ends of the hame collar body and in front and to the outside of, the breast collar, a withers pad having rings at its opposite ends and straps connecting the withers pad, and the breast collar for supporting the same, a back pad having rings at its opposite ends, traces having rings at their forward ends, tugs connected to the hame collar and to the rings at the opposite ends of the back pad, the rear portions of the breast collar constituting tugs, the same being passed through the rings of the traces and brought forward and connected to the rings of the back pad, a neck yoke and hold-back straps connected to opposite ends of the neck yoke and the lower ends of the hames and to the rings of the withers pad, substantially as and for the purpose described.

LUTHAN WHITTEN HAMMOND.

Witnesses:
  GEORGE DEWIT WILSON,
  BERT CORAL STEVENS.

Copies of this patent may be obtained for five cents each, by addressing the "Commissioner of Patents, Washington, D. C."